United States Patent [19]

Omori

[11] 4,325,184

[45] Apr. 20, 1982

[54] APPARATUS FOR MANUFACTURING COILED COUPLING ELEMENTS FOR SLIDE FASTENERS

[75] Inventor: Shigenori Omori, Uozu, Japan

[73] Assignee: Yoshida Kogyo K.K., Tokyo, Japan

[21] Appl. No.: 210,296

[22] Filed: Nov. 25, 1980

Related U.S. Application Data

[63] Continuation-in-part of Ser. No. 971,645, Dec. 20, 1978, abandoned.

[30] Foreign Application Priority Data

Dec. 30, 1977 [JP] Japan .................................. 52-158065

[51] Int. Cl.³ .............................................. B29D 5/00
[52] U.S. Cl. ...................................... 29/766; 425/391
[58] Field of Search ................. 29/408, 410, 766, 769, 29/780, 819, 820; 57/3, 10; 425/391

[56] References Cited

U.S. PATENT DOCUMENTS

| | | | |
|---|---|---|---|
| 3,137,037 | 6/1964 | Wilcken | 29/766 |
| 3,152,433 | 10/1964 | Burbank | 425/391 X |
| 3,262,157 | 7/1966 | Fujisaki | 425/391 X |
| 3,353,217 | 11/1967 | Bashover | 425/391 |
| 3,680,604 | 8/1972 | Frohlich et al. | 425/391 X |

FOREIGN PATENT DOCUMENTS

| | | | |
|---|---|---|---|
| 1492694 | 7/1967 | France | 425/391 |
| 45-40939 | 12/1970 | Japan . | |
| 46-1132 | 1/1971 | Japan . | |

*Primary Examiner*—Ervin M. Combs
*Attorney, Agent, or Firm*—Hill, Van Santen, Steadman, Chiara & Simpson

[57] ABSTRACT

Improvements in apparatus of the type including a mandrel around which a continuous filament is coiled and which has a guide channel formed longitudinally therein for slidably receiving a continuous core to be positioned within the coil, and a mandrel holder holding the mandrel adjacent one end thereof and reciprocating with the latter in the longitudinal direction thereof in step with the formation of each convolution of the coil. A unit length of the core required for each coil convolution is forcibly pulled away from a core pay-off bobbin by a pair of pull-out rolls actuated intermittently by a ratchet mechanism. The mandrel holder has formed therein passageways through which the core travels from the pull-out roll pair to the entrance end of the guide channel in the mandrel. The passageways are adapted to provide several obtuse-angled bends for holding the core in frictional contact with the mandrel holder, so that the successive unit core lengths are delivered without tension to the guide channel in the mandrel with the reciprocation of the mandrel holder.

9 Claims, 7 Drawing Figures

FIG. 2
FIG. 3
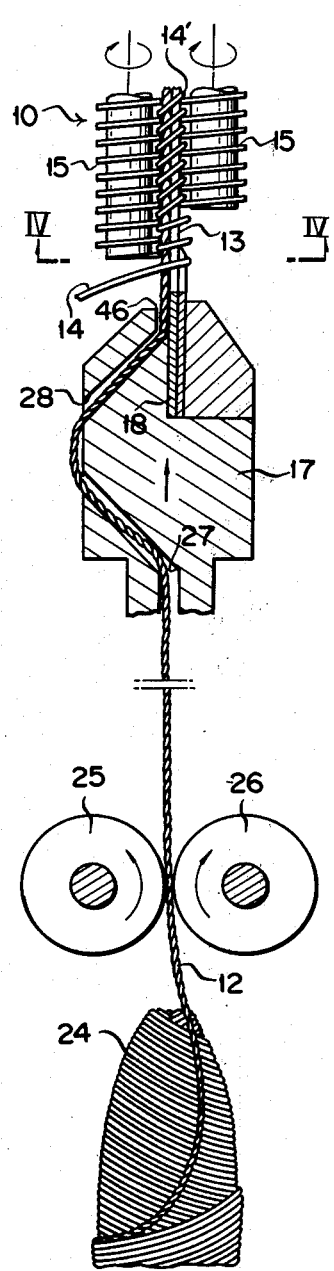
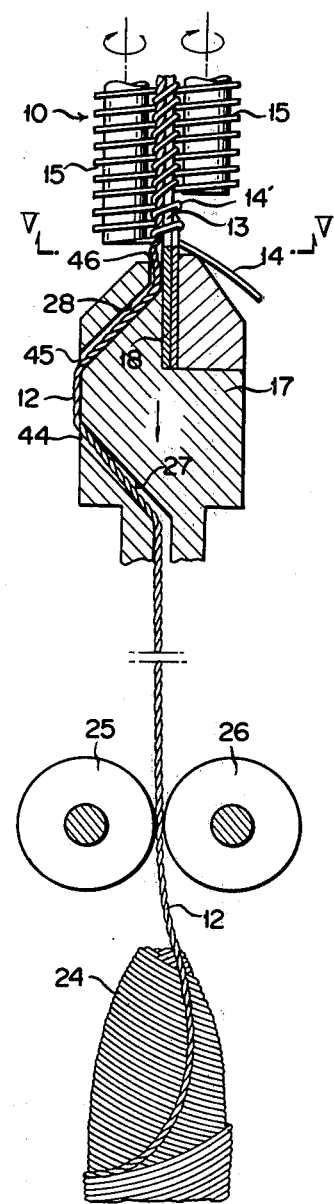

APPARATUS FOR MANUFACTURING COILED COUPLING ELEMENTS FOR SLIDE FASTENERS

CROSS REFERENCE TO RELATED APPLICATION

This application is a continuation-in-part application of our prior U.S. application Ser. No. 971,645 filed Dec. 20, 1978, now abandoned.

BACKGROUND OF THE INVENTION

1. Field of the Invention

This invention relates to the manufacture of a continuous length of coupling element of the known helicoidal-coil type together with a continuous length of core cord received in place therein, for use in slide fasteners. More specifically, the invention is directed to a method of, and means for, feeding the core cord to a coiling station in which a continuous filament of desired material is coiled while receiving the core cord in place within its successive turns or convolutions.

2. Description of the Prior Art

Apparatus for the manufacture of a continuous length of helicoidal-coil type coupling element together with a continuous core cord received in place therein is described and claimed in Japanese Pat. Pub. No. 45-40939, published on Dec. 22, 1970. Further, of this apparatus, means for feeding at a controlled rate the continuous core cord to be received within the continuous coupling element is separately described and claimed in Japanese Pat. Pub. No. 46-1132, published on Jan. 12, 1971.

According to the second mentioned Japanese patent, the continuous core cord travelling from a pay-off bobbin to coiler mechanism is made to pass over a guide roller rotatably mounted on a reciprocating lever. This lever is oscillated in step with the reciprocation of a mandrel holder toward and away from the coiler mechanism so that successive unit lengths of the core cord may be taken away from the pay-off bobbin by the oscillatory motion of the guide roller.

It has been later found that according to this prior art core cord feed mechanism, the successive lengths of the core cord taken away from the pay-off bobbin tend to fluctuate. Another serious disadvantage is that the successive lengths of the core cord are fed into the coiler mechanism in a more or less tensed or extended state. This is objectionable for the following reason.

In stitching helicoidal-coil type coupling elements onto carrier tapes, the stitches are usually passed through the core cord within the coupling elements. Receiving the stitches, the core cord tend to meander and to bulge or swell at intervals. This results in some reduction in the lengths of the core cord. It will therefore be seen that the core cord must be fed into the coiler mechanism at a rate anticipating the above lengthwise reduction on stitching.

The noted prior art core cord feed mechanism is further disadvantageous in that it does not permit ready adjustment of the unit length of the core cord to be fed into the coiler mechanism or to be taken away from the pay-off bobbin. This disadvantage is a direct result of the fact that the reciprocation of the mandrel holder is utilized both for pulling successive lengths of the core cord away from the pay-off bobbin and for feeding them into the coiler mechanism. Each unit length of the core cord to be taken away from the pay-off bobbin must be readjusted when, for example, a change is made from one core cord to another of different material or make. If such readjustment is not effected, the rate at which the new core cord is actually fed into the coiler mechanism may inordinately increase or decrease because of the different degree of frictional resistance to which the core cord is subjected on its way from the pay-off bobbin to the coiler mechanism.

SUMMARY OF THE INVENTION

It is an object of this invention to provide an improved method of, and mechanism for, feeding a continuous core cord to a coiling station without application of tension, in the manufacture of a continuous length of helicoidal-coil type coupling element together with the core cord received in place therein.

Another object of the invention is to provide a method and mechanism of the character described which permit ready and accurate adjustment of the rate at which the core cord is actually fed into the coiling station.

Briefly, the method of this invention comprises forcibly pulling away from a core cord pay-off section a unit length of a core cord having such a length as containing an extra part corresponding to a margin for its shrinkage caused by stitching it on carrier tapes which the length is slightly greater than one pitch of each convolution of a coil being manufactured, delivering the unit length of the core cord to a coiling station without applying tension to the core cord, and repeating the foregoing steps with the formation of each convolution of the coil.

The improved core cord feed mechanism of this invention is intended for use in apparatus of the type having a reciprocating member disposed adjacent to a coiler mechanism and adapted to make a single reciprocation toward and away from same during the formation of each coil convolution by the coiler mechanism. The core cord feed mechanism includes means actuated intermittently for forcibly pulling away from core cord pay-off means successive unit lengths of the core cord required for successive convolutions of the coil. The reciprocating member has formed therein a passageway or passageways through which the core cord travels from the forcibly pulling means to the coiler mechanism. The passageway or passageways are so formed as to hold the core cord at least partly in frictional contact with the reciprocating member, so that the successive unit lengths of the core cord can be delivered without tension to the coiler mechanism by the reciprocation of the reciprocating member.

Preferably, the reciprocating member is a mandrel holder holding a mandrel which is included in the coiler mechanism and around which a filament is coiled. The mandrel has formed therein a guide channel into which the successive unit lengths of the core cord are fed by the reciprocation of the mandrel holder together with the mandrel.

Also preferably, the forcibly pulling means comprises a pair of pull-out rollers urged toward each other and intermittently actuated as by a ratchet mechanism in step with the operation of the coiler mechanism. Each unit length of the core cord to be fed into the guide channel in the mandrel can be adjustably varied through adjustment of the angle through which the pair of pull-out rollers are rotated each time by the ratchet mechanism.

The above and other objects, features and advantages of this invention and the manner of attaining them will become more clearly apparent, and the invention itself will best be understood, from the following description taken together with the accompanying drawings showing a preferred embodiment of the invention.

BRIEF DESCRIPTION OF THE DRAWINGS

FIG. 2 is a schematic representation, partly in elevation and partly in section, explanatory of the way that a continuous length of core cord is fed from a pay-off bobbin to a coiler mechanism in accordance with the concepts of this invention;

FIG. 3 is a schematic representation, partly in elevation and partly in section, similar to the view shown in FIG. 2 and explanatory of the way that a successive convolution of the coil 14' is completed in accordance with the concepts of the present invention;

DETAILED DESCRIPTION

Figure 1:
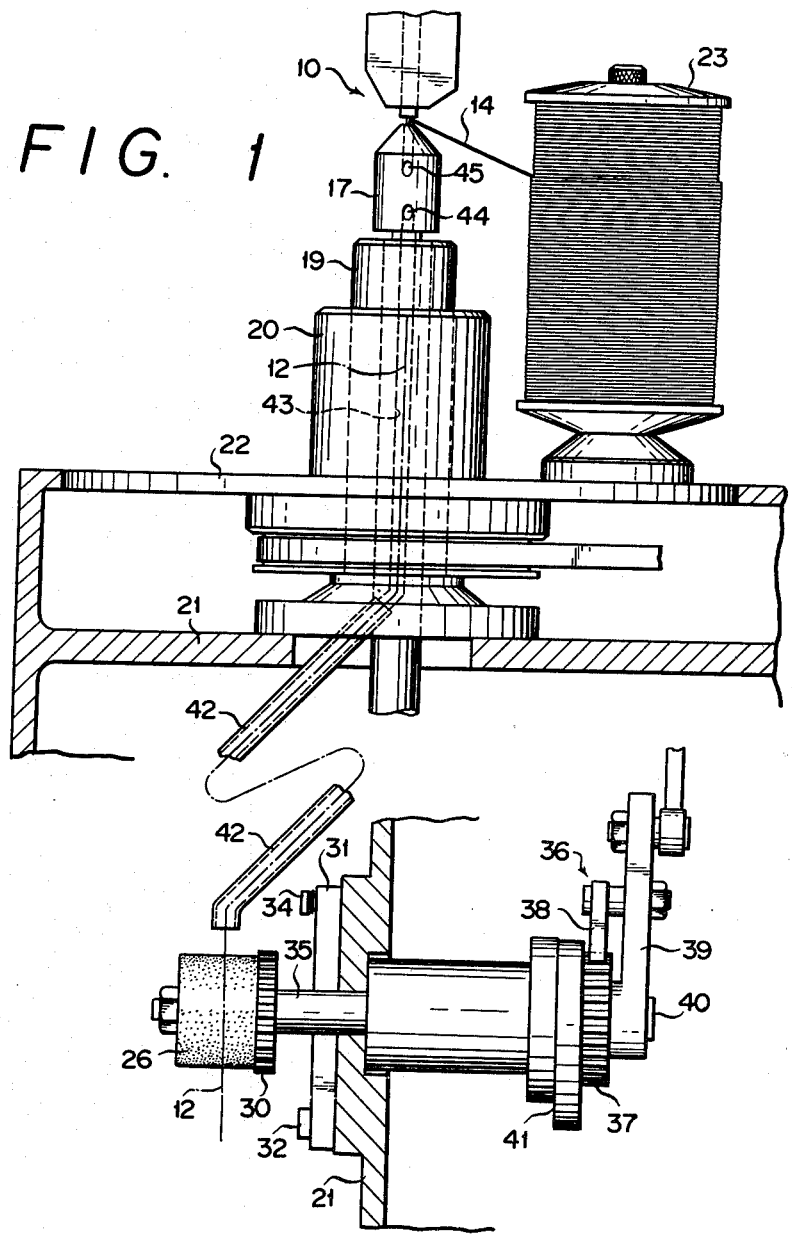
FIG. 1 is a partial side elevational view, partly in section, showing a greater detail some essential parts of the core cord feed mechanism in accordance with the invention, as well as some pertinent parts of the apparatus in which the mechanism is incorporated.
Figure 6:
FIG. 6 is a partial elevational view of a continuous length of helicoidal-coil type coupling element having the core cord received in place therein, which has been manufactured by the apparatus of FIGS. 1, 2 and 3.

Generally designated 10 in FIGS. 1 and 2 or 3 of the above drawings is a coiling station or coiler mechanism included in the apparatus for the manufacture of a continuous length of helicoidal-coil type coupling element 11 shown in FIG. 6, together with a continuous core such as cord 12 received in place therein, for use in slide fasteners. As better seen in FIG. 2, the coiler mechanism 10 comprises an upstanding mandrel 13 around which a continuous filament 14 of a thermoplastic synthetic resin or the like is coiled in a generally helicoidal sense, and a pair of rotary screws 15 disposed on opposite sides of the mandrel for feeding the coiled filament 14' upwardly along same while modifying its shape.

Figure 4:
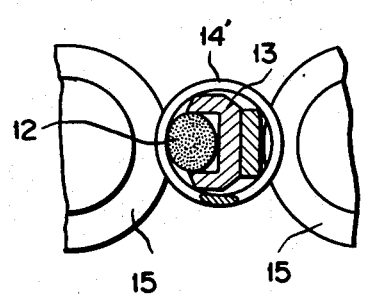
FIGS. 4 and 5 are partially cross sectional views taken along lines IV—IV and V—V shown in FIGS. 2 and 3, respectively.
Figure 5:
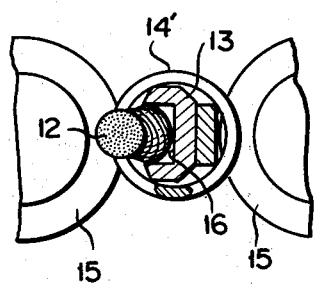

As shown cross-sectionally and on an enlarged scale in FIG. 4 or 5, the mandrel 13 has formed therein a guide channel 16 extending throughout its length. The guide channel 16 is intended to slidably receive the core cord 12 to be embraced by the turns or convolutions of the coil 14'.

A mandrel holder 17 disposed under the coiler mechanism 10 has embedded therein the downward extension 18 of the mandrel 13 for securely holding same. The mandrel holder 17 is fixedly mounted on the top of a slide 19. This slide is slidably fitted in a stationary, upstanding guide sleeve 20 on the frame 21 of the apparatus for up and down motion relative to same.

Seen at 22 in FIG. 1 is a turntable coaxially surrounding the guide sleeve 20 for revolution around same. A spool 23 mounted eccentrically on the turntable 22 has the continuous filament 14 wouned thereon. With the revolution of the turntable 22, therefore, the filament 14 unwound from the spool 23 is coiled around the mandrel 13 and the core cord 12 slidably received in its guide channel 16. The mandrel holder 17 together with the mandrel 13 thereon is to be moved up and down by the slide 19 in the guide sleeve 20, completing a single reciprocation with the formation of each convolution of the coil 14'.

The construction and operation of the apparatus as so far described is conventional, and therein lies no feature of this invention. Reference is directed to the aforementioned Japanese Pat. Pub. No. 45-40939 for further details on the construction and operation of this apparatus. A similar apparatus is also described and claimed in U.S. Pat. No. 3,262,157 issued to Yoshinori Fujisaki on July 26, 1966, although the apparatus has no provision for introducing a core cord into a coil simultaneously with its manufacture.

This invention is specifically directed to an improved method of, and means for, feeding the core cord 12 to the coiler mechanism 10 or, more specifically, to the entrance end of the guide channel 16 in the mandrel 13 of the coiler mechanism, in step with the formation of the successive convolutions of the coil 14'. As illustrated schematically in FIG. 2, the improved core feed mechanism of the invention comprises a bobbin 24 for paying off the core cord 12, a pair of pull-out rollers 25 and 26 rotated intermittently for forcibly pulling out successive unit lengths of the core cord 12 from the pay-off bobbin 24, and passageways 27 and 28 formed in the mandrel holder 17 for delivering therethrough the successive unit lengths of the core cord 12 to the coiler mechanism 10. Each of the successive unit lengths of the core cord 12 has such a length as containing an extra part corresponding to a margin for its shrinkage caused by stitching it on carrier tapes, and the length is slightly greater than the pitch of each convolution of the coupling element 11.

Figure 7:
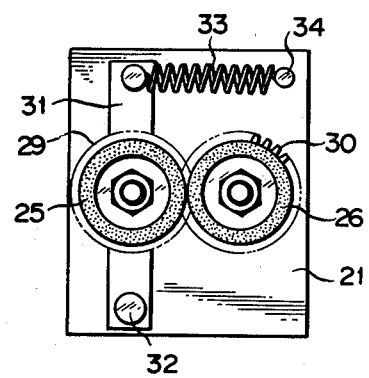
FIG. 7 is an elevational view of a pair of pull-out rollers and associated means used in the core feed mechanism of FIGS. 1, 2 and 3.

As shown in greater detail in FIGS. 1 and 7, the pull-out rollers 25 and 26 are coaxially provided with spur gears 29 and 30, respectively. These spur gears 29 and 30 are in mesh with each other and rotatable jointly with the respective pull-out rollers 25 and 26. The pull-out roller 25 together with the gear 29 is rotatably mounted on a lever 31 intermediate its ends. One end of the lever 31 is pivotally mounted at 32 on the frame 21, and a helical extension spring 33 extends between the other end of the lever and a spring retainer 34 on the frame. The pull-out roller 25 is thus spring biased toward the other roller 26 for exerting pressure on the core cord 12 passing therebetween.

The other pull-out roller 26 together with the gear 30 is fixedly mounted on a rotatable, stepped shaft 35 at one end thereof. Mounted on the other end of the shaft 35 is a ratchet mechanism 36 for intermittently rotating the pull-out roller 26 and gear 30 through a preassigned angle. The ratchet mechanism 36 comprises a ratchet wheel 37 fixedly mounted on the shaft 35, and an actuating pawl 38 mounted on a lever 39 and engageable with the peripheral teeth on the ratchet wheel for propelling same in a clockwise direction as viewed in FIGS. 2 and 7. The lever 39 is pivotally mounted on the outermost end portion 40 of the shaft 35.

The lever 39 of the above ratchet mechanism 36 is assumed to be driven intermittently, in timed relationship to the progress of the coiling operation by the coiler mechanism 10, completing a single reciprocation with the formation of each convolution of the coil 14' around the mandrel 13. The intermittent clockwise rotation of the pull-out roller 26 is transmitted to the other pull-out roller 25 via the intermeshing gears 29 and 30, so that the successive unit lengths of the core cord 12 are pulled away from the pay-off bobbin 24 by such intermittent joint rotation of the pull-out rollers 25 and 26 in the opposite directions. It is further understood that the pull-out rollers 25 and 26 are thus rotated at a speed slightly higher than the speed at which each coil convolution is formed around the mandrel 13. Seen at 41 is a brake for arresting the rotation of the shaft 35 as required.

Preferably, a guide tube may be provided as at 42 in FIG. 1 for directing the core cord 12, forcibly pulled away from the pay-off bobbin 24 by the pull-out rollers 25 and 26 as above, upwardly therethrough to a vertical passageway 43 formed centrally through the slide 19. This passageway 43 is in open communication with the passageway 27 in the mandrel holder 17.

The mandrel holder passageway 27 is angled outwardly and upwardly from the center of the mandrel holder 17 and has an outlet opening 44 at the circumference thereof. The other mandrel holder passageway 28 has its inlet opening 45 located right above the outlet opening 44 of the passageway 27 and is angled upwardly and inwardly therefrom. The outlet opening 46 of the passageway 28 is located at the lower, entrance end of the guide channel 16 in the mandrel 13 and is aligned with the guide channel.

It will be noted that the complete path of the core cord 12 through the mandrel holder 17 is bent at obtuse angles in several locations. These obtuse-angled bends are intended to establish frictional contact between the core cord 12 and the mandrel holder 17 as the former passes through the latter, thereby holding the core cord 12 in the passageways 27 and 28 of the mandrel holder 17 without slipping down therefrom when the mandrel holder 17 is moved upwards together with the slide 19.

In the use of the apparatus the core cord 12 unwound from the pay-off bobbin 24 is first threaded between the pair of pull-out rollers 25 and 26, upwardly through the passageway 43 in the slide 19, into and out of the passageway 27 in the mandrel holder 17, and then into and out of the other mandrel holder passageway 28. On emerging from the outlet opening 46 of the mandrel holder passageway 28, the core cord 12 is immediately introduced into the entrance end of the guide channel 16 in the mandrel 13.

As the apparatus is set in operation, as shown in FIG. 2, the pair of pull-out rollers 25 and 26 are rotated at regular intervals by the ratchet mechanism 36, at a speed slightly higher than the speed at which each convolution of the coil 14' is completed around the mandrel 13. The pull-out rollers 25 and 26 on each actuation thus operate to forcibly pull away from the pay-off bobbin 24 a desired unit length of the core cord 12 as described hereinbefore.

The unit length of the core cord 12 thus forced away from the pay-off bobbin 24 is introduced into the passageways 27 and 28 in the mandrel holder 17 each time the latter is lowered. On the other hand, the mandrel holder 17 begins it upward movement from the bottom dead center thereof together with the slide 19 simultaneously with or slightly later than the start of rotation of the pair of pull-out rollers 25 and 26. By the subsequent upward movement of the mandrel holder 17, the unit length of the core cord 12 is led without tension to the lowermost portion of the coiler mechanism 10 in a manner such that the core cord 12 is slightly slackened thereat, because the pair of pull-out rollers for forcibly pulling out the unit length of the core cord 12 is rotated at the speed slightly higher than the speed at which each convolution of the coil 14' is completed around the mandrel 13 and further the succeeding unit length of the core cord 12 passing through the meandering path in the mandrel holder 17 is held in frictional contact therewith.

When the mandrel holder 17 is reached at the top dead center thereof, the continuous filament 14 is encircled around the mandrel 13 in accordance with the revolution of the turntable 22 so as to form a successive convolution of the coil 14' as shown in FIG. 3. After the completion of the successive convolution of the coil 14', the mandrel holder 17 is moved downwards.

Thus, by the repetition of the foregoing procedure, the successive unit lengths of the core cord 12 can be fed without tension into the coiler mechanism 10, at a rate exactly corresponding to the rate of formation of the successive convolutions of the coil 14'. It will be evident that the feeding rate of the core cord 12 is easy to control through adjustment of the angle through which the pair of pull-out rollers 25 and 26 are rotated on each actuation by the ratchet mechanism 36.

It is clear from the foregoing that the present invention is well calculated to fulfill the objects set forth herein. Since numerous modifications or changes of the invention will readily occur to those skilled in the art on the basis of this disclosure, it is intended that all matter described herein and shown in the accompanying drawings shall be interpreted as illustrative and not in a limitative sense.

What is claimed is:

1. In apparatus for the manufacture of a continuous length of helicoidal-coil type coupling element together with a continuous core cord received in place therein, the apparatus being of the type including a coiler mechanism for coiling a continuous filament while introducing the core cord into place within the convolutions of the coil, and a reciprocating member disposed adjacent to the coiler mechanism and controlled by a reciprocating mechanism to reciprocate relative to the coiler mechanism during the formation of each convolution of the coil, the improvement comprising means for paying off the core cord, means adapted to be actuated intermittently, at a speed slightly higher than the speed at which each coil convolution is formed around a mandrel of the coiler mechanism, for forcibly pulling away from the pay-off means successive unit lengths of the core cord and delivering each unit length without tension to the coiler mechanism in step with the corresponding convolution of the coil such that the core cord is substantially slack at the point of delivery to the coiler mechanism during the time that the reciprocating member is moving away from the pulling means, each unit length being longer than a pitch of each convolution of the coupling element, and a passageway in the reciprocating member through which the core cord passes from the pulling means to the coiler mechanism, the passageway being adapted to hold the core cord at least party in frictional contact with the reciprocating member, the reciprocation of which is towards and away from the pulling means.

2. The apparatus according to claim 1, wherein the pulling means comprises a pair of rolls urged toward each other.

3. The apparatus according to claim 2, wherein the pair of rolls are actuated intermittently by a ratchet mechanism.

4. The apparatus according to claim 1, wherein the passageway is bent to establish the frictional contact of the core with the reciprocating member.

5. The apparatus according to claim 1, wherein the passageway has a plurality of obtuse-angled bends to establish the frictional contact of the core with the reciprocating member.

6. In apparatus for the manufacture of a continuous length of helicoidal-coil type coupling element together with a continuous core cord received in place therein, the apparatus being of the type including a coiler mechanism for coiling a continuous filament while introducing the core cord into place within the convolutions of the coil, a mandrel around which a continuous filament is coiled, the mandrel having a guide channel formed longitudinally therein for slidably receiving the core cord to be positioned within the convolutions of the coil, and a mandrel holder holding the mandrel adjacent one end thereof and reciprocating together with the latter in the longitudinal direction thereof in step with the formation of each convolution of the coil around the mandrel, the improvement comprising means for paying off the core cord, means adapted to be actuated intermittently, at a speed slightly higher than the speed at which each coil convolution is formed around the mandrel, for forcibly pulling away from the pay-off means successive unit lengths of the core cord and making the core cord substantially slack at the point of delivery to the guide channel in the mandrel during the time that the mandrel and the mandrel holder are moving away from the pulling means, to allow for possible subsequent lengthwise reduction of the core cord, each unit length being longer than a pitch of each convolution of the coupling element, and a passageway formed in the mandrel holder through which the core cord travels from the pulling means to the entrance end of the guide channel for holding the core cord at least partly in frictional contact with the mandrel holder, the pulling means delivering successive unit lengths of the core cord without tension to the guide channel in the mandrel in step with the formation of the successive convolutions of the coil.

7. The apparatus according to claim 6, wherein the pulling means comprises a pair of rolls urged toward each other.

8. The apparatus according to claim 6, wherein the passageway is bent to establish the frictional contact of the core with the reciprocating member.

9. The apparatus according to claim 6, wherein the passageway has a plurality of obtuse-angled bends to establish the frictional contact of the core with the reciprocating member.

* * * * *